United States Patent
Yokokawa et al.

(10) Patent No.: US 7,321,709 B2
(45) Date of Patent: Jan. 22, 2008

(54) OPTICAL CABLE

(75) Inventors: Tomoyuki Yokokawa, Yokohama (JP); Eisuke Sasaoka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/578,711

(22) PCT Filed: Nov. 11, 2005

(86) PCT No.: PCT/JP2005/020707

§ 371 (c)(1),
(2), (4) Date: May 10, 2006

(87) PCT Pub. No.: WO2006/051898

PCT Pub. Date: May 18, 2006

(65) Prior Publication Data

US 2007/0104429 A1 May 10, 2007

(30) Foreign Application Priority Data

Nov. 11, 2004 (JP) .............................. 2004-327950

(51) Int. Cl.
*G02B 6/44* (2006.01)
(52) U.S. Cl. ................... 385/103; 385/100; 385/102
(58) Field of Classification Search ................ 385/100, 385/102, 103, 109, 113
See application file for complete search history.

(56) References Cited

U.S. PATENT DOCUMENTS 6,185,351 B1 * 2/2001 Daneshvar et al. ......... 385/114

FOREIGN PATENT DOCUMENTS

| JP | 62-073216 | 4/1987 |
|----|-----------|--------|
| JP | 62-73216 A | 4/1987 |
| JP | 5-15005 | 2/1993 |
| JP | 5-15005 U | 2/1993 |
| JP | 11-305086 | 11/1999 |
| JP | 11-305086 A | 11/1999 |

OTHER PUBLICATIONS

International Search Report issued in corresponding international Application PCT/JP2005/020707, dated Dec. 13, 2005.

(Continued)

*Primary Examiner*—Jennifer Doan
(74) *Attorney, Agent, or Firm*—McDermott Will & Emery LLP

(57) ABSTRACT

An optical cable according to the present invention relates to an optical cable having a construction to enable reduction of a cable outer diameter, and/or improvement of contained efficiency of coated optical fibers while an increase of transmission loss in each coated optical fiber is suppressed. The optical cable has a loose-tube type of structure constructed by: a tension member; a plurality of tubes stranded together around the tension member; and an outer sheath covering the outer periphery of the plurality of tubes. One or more coated optical fibers are contained in each tube. A ratio of A/B is 6.3 or more but 7.0 or less, where each coated optical fiber has a mode field diameter A in a range of 8.6±0.4 μm at a wavelength of 1.31 μm, and where a fiber cutoff wavelength thereof is B μm.

15 Claims, 10 Drawing Sheets

OTHER PUBLICATIONS

C. Unger et al., "Investigation of the Microbending Sensitivity of Fibers", Journal of Lightwave Technology, 1994, pp. 591-596, vol. 12, No. 4.

Mahlke et al. "Fiber Optic Cables", Publicis MCD Corporate Publishing, 2001, 121-132.

Yamamoto et al. "Water-Free Pure-Silica-Core Fibre", ECOC 2004 Proceedings, p. 844-847, vol. 4, paper Th2.3.1.

"Ultra-low loss and bend insensitive pure-silica-core fiber complying with G.652 C/D and its applications to a loose tube cable", 53rd IWCS/Focus Conference, Proceedings of the International Wire & Cable Symposium, Nov. 2004.

Unger et al., "Investigation of the Microbending Sensitivity of Fibers, Journal of Lightwave Technology", vol. 12, No. 4, pp. 591-596, Apr. 1994.

Mahike et al., "Fiber Optic Cables", Publics MCD Coporate Publishing (2001), pp. 121-123.

Yamamoto et al., "Water-Free Pure-Silica-Core Fibre", ECOC 2004 Proceedings vol. 4, Paper Th2.3.1 pp. 844-847.

Yokokawa et al., "Ultra-low loss and bend insensitive pure-silica-core fiber complying with G.652 C/D and its applications to a loose tube cable", 53rd IWCS/Focus Conference, Proceedings of the International Wire & Cable Symposium, Nov. (2004).

English Translation of International Preliminary Report on Patentability for International Appln. No. PCT/JP2005/020707, dated May 24, 2007.

* cited by examiner

OPTICAL CABLE

This application is the U.S. National Phase under 35 U.S.C. § 371 of International Application No. PCT/JP2005/020707, filed Nov. 11, 2005, which in turn claims the benefit of Japanese Application No. 2004-327950, filed Nov. 11, 2004, the disclosures of which Applications are incorporated by reference herein in their entirety.

TECHNICAL FIELD

The present invention relates to an optical cable constructed by bundling a plurality of optical fibers.

BACKGROUND ART

For the structure of an optical cable bundled by a plurality of coated optical fibers, a variety of structures such as tape-slotted type and loose-tube type are known (see Non-Patent Document 1). A tape-slotted type of optical cable is excellent in contained efficiency of the coated optical fiber; there occurs easily bending in the coated optical fiber during the manufacture or using, which tends to increase micro-bending loss. On the other hand, a loose-tube type of optical cable is characterized in that an increase of the micro-bending loss is small though it is inferior to the contained efficiency of the coated optical fibers as compared to the tape-slotted type of optical cable.

Non-Patent Document 1: Gunther Mahike, et al., "Fiber Optic Cables, Fundamentals Cable Design System Planning", 4th revised and enlarged edition, 2001, Publics MCD Corporation Publishing

DISCLOSURE OF THE INVENTION

Problem to be Solved by the Invention

After studying a conventional optical cable, the inventors found out the following problems. Namely, in the tape-slotted type of optical cable, there easily occurs bending in the coated optical fibers during the manufacture and service, and the micro-bending loss tends to increase. On the other hand, the loose-tube type of optical cable is inferior to the tape-slotted type of optical cable in respect of the contained efficiency of the coated optical fibers. In this respect, it is considered that even in the loose-tube type of optical cable, the contained efficiency of the coated optical fibers can be improved such that an outer diameter of the cable is reduced while the number of the coated optical fibers to be contained is maintained. However, in that case, there occurs a problem that the transmission loss of the coated optical fiber may increase.

The present invention is made to solve the aforementioned problem, and it is an object to provide an optical cable having a construction that enables reduction of an outer diameter of the cable, and/or improvement of contained efficiency of coated optical fibers while an increase of transmission loss in each of coated optical fibers to be bundled is suppressed.

Means for Solving Problem

In order to overcome the aforementioned problem, an optical cable according to the present invention comprises: a tension member; a plurality of tubes each containing a plurality of coated optical fibers and stranded together around the tension member; and an outer sheath covering the outer periphery of the plurality of tubes stranded together around the tension member.

In particular, a ratio of A/B is 6.3 or more but 7.0 or less, where a mode field diameter A of the coated optical fiber falls in a range of 8.6±0.4 µm at a wavelength of 1.31 µm, and a fiber cutoff wavelength of the coated optical fiber is B µm.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

Effect of the Invention

In accordance with an optical cable of the present invention, reduction of an outer diameter of the cable and/or improvement of contained efficiency of coated optical fibers can be achieved while an increase of transmission loss in the coated optical fibers is suppressed.

DESCRIPTION OF THE REFERENCE NUMERALS

1 ... optical transmission system; 10 ... optical cable; 11 ... coated optical fiber; 12 ... tube; 13 ... tension member; 14 ... pressure roll; 15 ... outer sheath; 20 ... optical transmitter; 30 ... optical receiver; 110 ... ribbon fiber; 120 ... colored thread; 200 ... cable force-feeding dram; and 300 ... duct.

BEST MODES FOR CARRYING OUT THE INVENTION

In the following, embodiments of the optical cable according to the present invention will be explained in detail with reference to FIGS. 1 to 10. In the explanation of the drawings, the same elements will be denoted by the same reference symbols and these redundant descriptions will be omitted.

Figure 1:
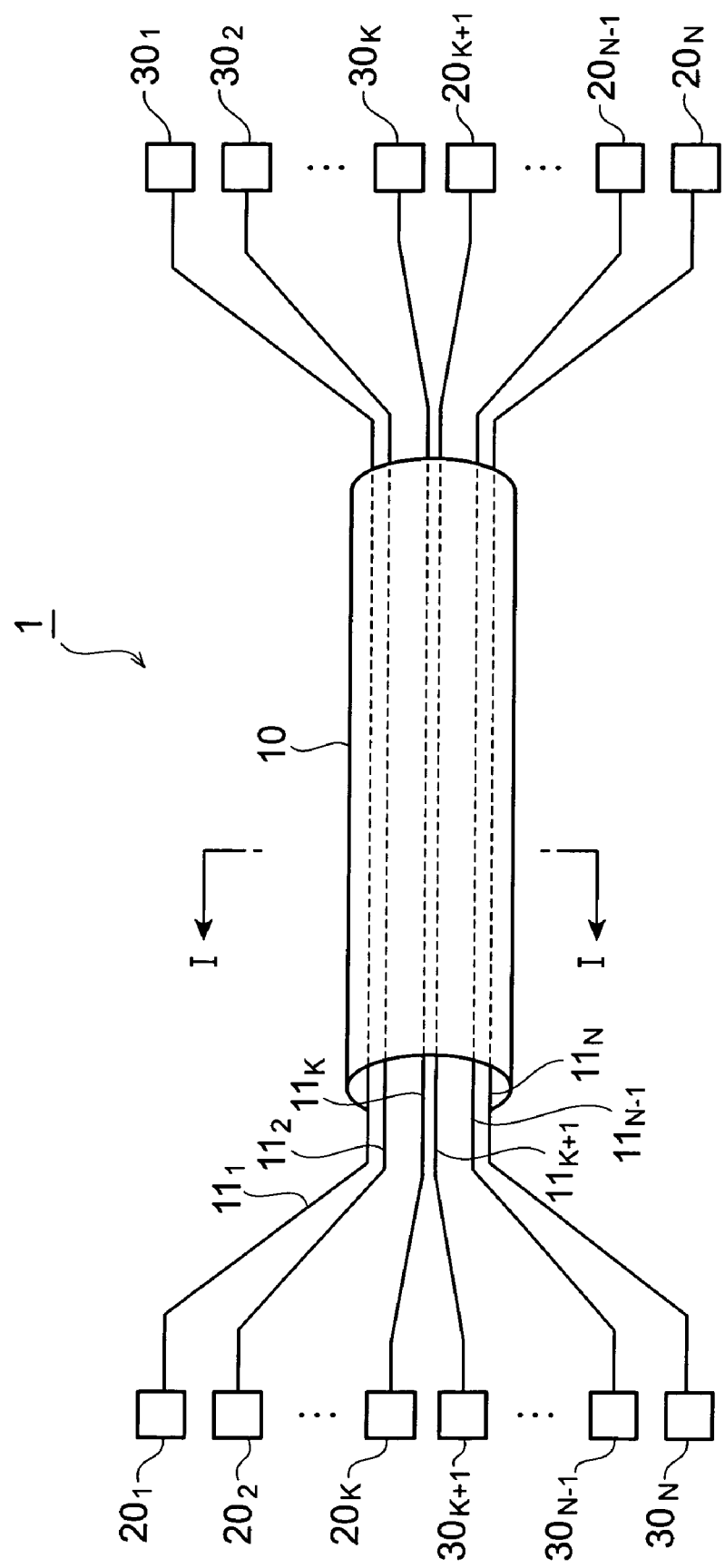
FIG. 1 is a diagram showing a schematic construction of an optical transmission system in which one embodiment of an optical cable according to the present invention is applied as an optical transmission line.

FIG. 1 is a diagram showing a schematic construction of an optical transmission system in which one embodiment of an optical cable according to the present invention is applied as an optical transmission line. An optical transmission system shown in FIG. 1 composes an optical cable 10, optical transmitters $20_1$ to $20_N$, and optical receivers $30_1$ to $30_N$. In the optical cable 10, N optical fibers $11_1$ to $11_N$ (N: an integer of two or more) are bundled. The optical transmitters $20_1$ to $20_K$ and the optical receivers $30_{K+1}$ to $30_N$ are arranged on one end side of the optical cable 10, while the optical transmitters $20_{K+1}$ to $20_N$ and the optical receivers $30_1$ to $30_K$ are arranged on the other end side of the optical cable 10. The optical transmitter $20_n$ and the optical receiver $30_n$ are connected through a coated optical fiber $11_n$ to each other, and optical signals transmitted from the optical transmitter $20_n$ are arrived at the optical receiver $30_n$ after propagating the coated optical fiber $11_n$ (n: an integer of 1 or more but N more less).

Figure 2:
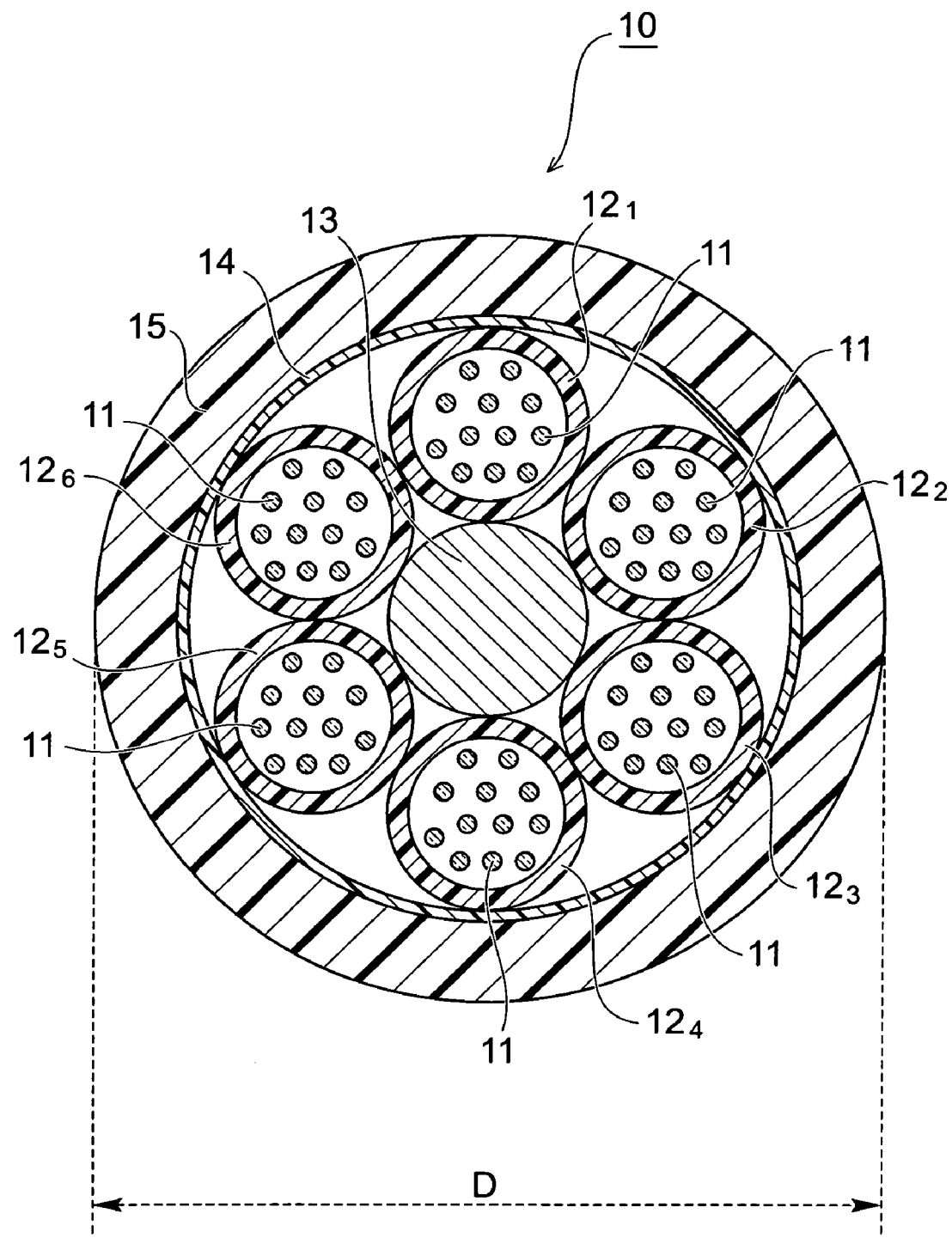
FIG. 2 is a view showing a cross-sectional structure of one embodiment of the optical cable according to the present invention (corresponding to the cross section along a line I-I in FIG. 1)

FIG. 2 is a view showing a cross-sectional structure of the optical cable according to the present invention, and corresponds to the cross section along a line I-I in FIG. 1. This optical cable 10 has a loose-tube type of structure such that six tubes $12_1$ to $12_6$ are stranded around a tension member 13. Then, these tubes $12_1$ to $12_6$ are covered with a pressure roll 14 and an outer sheath 15. One or more coated optical fibers 11 (referred to as simply 'coated optical fiber 11' where an arbitrary one of the plurality of coated optical fibers $11_1$ to $11_N$ is represented) are contained in each tube 12 (referred to as simply 'tube 12' where an arbitrary one of the plurality of tubes $12_1$ to $12_6$ is represented). Each coated optical fiber 11 has a mode field diameter (MFD) A within the range of 8.6±0.4 μm at a wavelength of 1.31 μm, and a ratio A/B is 6.3 or more but 7.0 or less when a fiber cutoff wavelength is set to B μm. More preferably, the ratio A/B is 6.3 or more but 6.8 or less. Alternatively, in the optical cable 10, a bending loss of each coated optical fiber 11 in the diameter of 20 mm at a wavelength of 1.55 μm is 3 dB/m or less; more preferably the bending loss is 1.5 dB/m or less. For example, the mode field diameter at the wavelength of 1.31 μm is 8.53 μm; the fiber cutoff wavelength is 1.3 μm; the ratio A/B is 6.56; and the bending loss in the diameter of 20 mm is 1.0 dB/m. The optical cable 10 thus designed enables reduction of a cable outer diameter D and/or improvement of contained efficiency of the coated optical fibers while suppressing the increase of the transmission loss in each coated optical fiber 11.

More preferably, each coated optical fiber 11 has a transmission loss of 0.31 dB/km or less at the wavelength of 1.31 μm, a transmission loss of 0.29 dB/km or less at the wavelength of 1.38 μm, and a transmission loss of 0.18 dB/km or less at a wavelength of 1.55 μm. The increase of the transmission loss at the wavelength of 1.55 μm of each coated optical fiber 11 is preferably 0.05 dB/km or less after a temperature cycle test within a range of temperature from −40° C. to +70° C. Each coated optical fiber 11 is placed over four days in an atmosphere of a hydrogen concentration of 1%. After hydrogen molecules are further removed, the increase of the transmission loss at the wavelength of 1.38 μm is preferably 0.05 dB/km or less. After γ-rays of an absorbed dose of 1000 Gy/hr are irradiated to each coated optical fiber for an hour, the increase of the transmission loss of each coated optical fiber 11 at the wavelength of 1.55 μm is preferably 2 dB/km or less.

The thickness of each tube 12 is preferably 0.2 mm or less. Additionally, the coefficient of dynamic friction of the outer sheath 15 is preferably 0.30 or less.

The occupied factor of the coated optical fibers 11 inside each tube 12 is preferably 20% or more but 75% or less. Here, the occupied factor of the coated optical fibers 11 is defined by (sectional area of the coated optical fiber 11× the number of fibers)/(sectional area of the tube 12). However, when the occupied factor of the coated optical fibers 11 is smaller than 20%, the outer diameter of the optical cable 10 becomes larger. Also, when the occupied factor of the coated optical fibers 11 is larger than 75%, the transmission loss becomes larger; particularly, the increase of the transmission loss due to cable construction becomes larger.

A ratio (D/N) is 0.15 mm or less, where D is the outer diameter of the optical cable 10, and N is the total number of the coated optical fibers 11 contained in the optical cable 10. However, when this ratio (D/N) is larger than 0.15 mm, the outer diameter of the optical cable 10 becomes larger.

Figure 3:
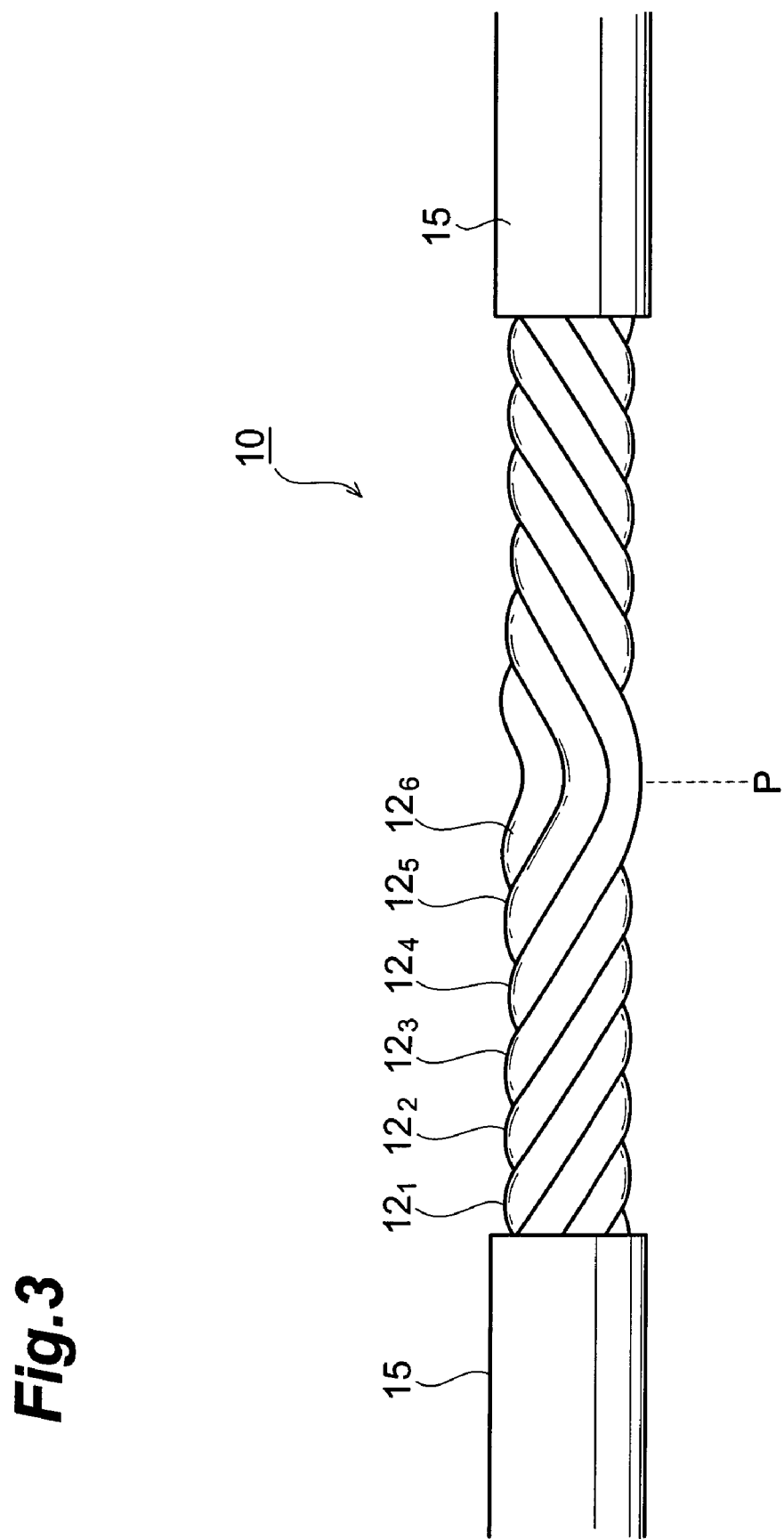
FIG. 3 is a side view showing a construction of one embodiment of the optical cable according to the present invention (a state that an outer sheath is removed)
Figure 4:
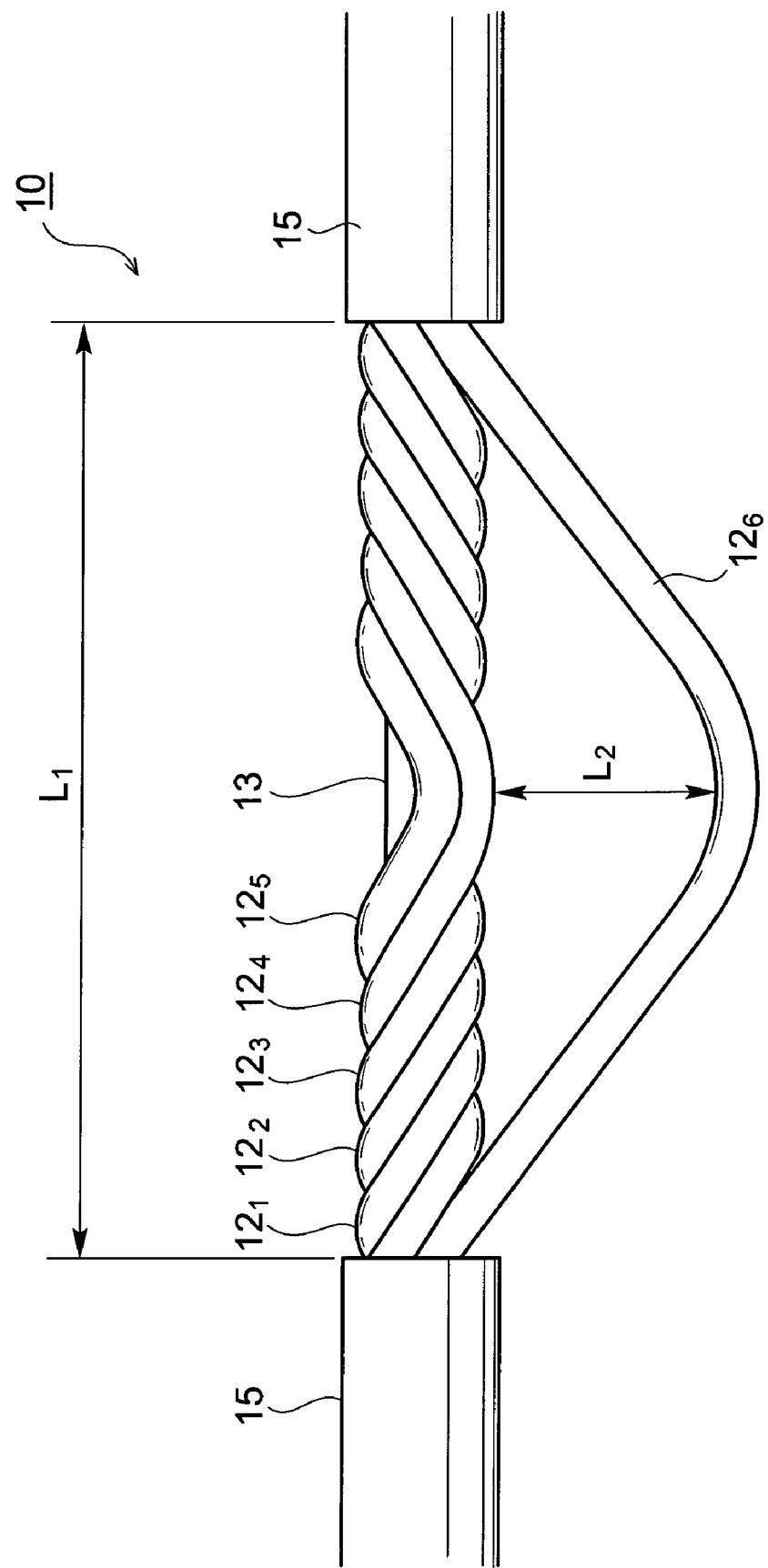
FIG. 4 is a side view showing a construction of one embodiment of the optical cable according to the present invention (a state that stranding of a tube is loosened)

FIGS. 3 and 4 are side views each showing the construction of the optical cable 10. FIGS. 3 and 4 each show a state of the optical cable 10 in which the outer sheath 15 and pressure roll 14 are removed over a certain range in the longitudinal direction of the optical fiber 10. In particular, FIG. 4 shows a state in which the strand of the tube $12_6$ is loosened.

As shown in FIG. 3, six tubes $12_1$ to $12_6$ are stranded together around the tension member 13. The stranded pitch of each tube 12 around the tension member 13 is preferably 100 m or less. Further, the stranded direction of each tube 12 around the tension member 13 is preferably reversed at a given position P in the longitudinal direction of the optical cable 10. Note that when the stranded pitch of each tube 12 around the tension member 13 is larger than 100 mm, temperature characteristics and mechanical characteristics thereof may be deteriorated.

As shown in FIG. 4, when the outer sheath 15 and pressure roll 14 are removed over the range $L_1$ of 500 mm in the longitudinal direction of the optical cable 10, the length $L_2$ of the removable tube 12 in which the coated optical fibers 11 are contained is preferably 20 mm or more. For this, the stranded direction of each tube 12 around the tension member 13 is reversed at a predetermined position P in the longitudinal direction of the optical cable 10, and thereby the pitch of the reversed position P is preferably 500 mm or less. With this construction, in a state where the range in the longitudinal direction of the optical cable 10 is suppressed 500 mm or less with respect to the outer sheath 15 and pressure roll 14 to be removed, the coated optical fibers 11 each having a length required for branching can be taken out.

Figure 5:
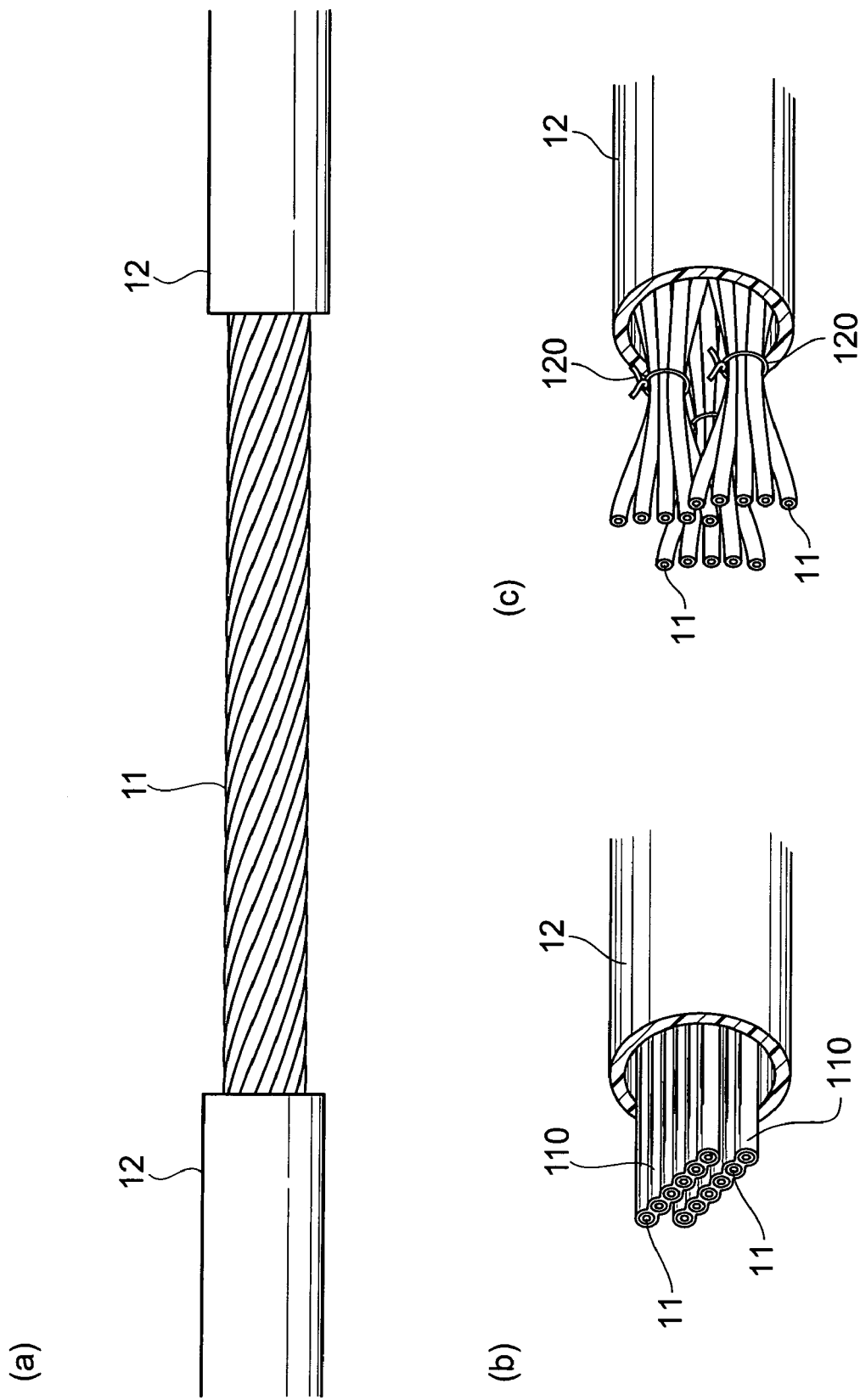
FIG. 5 is a side view showing a contained state of the coated optical fibers contained in each tube in one embodiment of the optical cable according to the present invention.

FIG. 5 is a side view showing a contained state of each coated optical fiber contained in each tube 12 in the optical cable 10. The area (a) of FIG. 5 shows a state in which the tube 12 is removed over a certain range in the longitudinal direction of the optical cable 10. As shown in FIG. 5, a plurality of coated optical fibers 11 in each tube 12 are contained, and the plurality of coated optical fibers 11 are stranded together with each other. The stranded direction of the plurality of coated optical fibers 11 may be reversed at a predetermined position in the longitudinal direction of the optical cable 10. Also, the plurality of coated optical fibers 11 are divided into a plurality of groups, and the coated optical fibers 11 of each group may be bundled by a colored thread.

In addition, as shown in the area (b) of FIG. 5, the coated optical fibers 11 may be contained in each tube 12 in a state of one or more ribbon fibers 110. Further, as shown in the area (c) of FIG. 5, the coated optical fibers 11 contained in each tube 12 may be divided into a plurality of groups, and the coated optical fibers 11 of each group may be bundled by colored threads 120.

An extra length ratio of each coated optical fiber 11 to each tube 12 is preferably 0% or more but 0.10% or less. In this case, the extra length ratio of each coated optical fiber 11 is defined by (100%×(coated optical fiber length−tube length))/(tube length)). Further, when the extra length ratio is smaller than 0%, the transmission loss at a high temperature (e.g., 70° C. or more) is boosted, while when the extra length ratio is larger than 0.10%, the transmission loss even at a low temperature (e.g., −40° C. or less) is increased.

On the other hand, when a cable is used in such an extremely cold district that the lowest temperature can reach −50° C. or −60° C., the extra length ratio in an initial state is desirably −0.03% or more but 0% or less.

In accordance with the optical cable 10, even in a linear cable, there occurs some bending in each coated optical fiber 11 due to stranding of each tube 12 and an extra length and/or stranding provided at each coated optical fiber 11. In this case, the minimum radius of curvature of each coated optical fiber 11 is preferably 15 mm or more but 100 mm or less.

It is more preferable that the thus constructed optical cable 10 has the following constructions or characteristics. That is, a ratio (W/N) is preferably 0.7 kg/km or less, where W is the cable weight per unit length of the optical cable 10, and N is the total number of the coated optical fibers 11 contained in the optical cable 10. When a test according to various types of mechanical test methods prescribed in Telecordia GR-20 Section 6.5 is carried out, an increase in transmission loss at the wavelength of 1.55 μm of each coated optical fiber 11 is preferably 0.05 dB or less during and after the test. PMDq of a coated optical fiber according to a test method prescribed in Section 5.5 and Annex A of IEC 60794-3 is preferably 0.05 ps/km$^{1/2}$ or less.

In addition, the bending rigidity of the optical cable 10 is preferably 5000 kg·mm$^2$ or more but 15000 kg·mm$^2$ or less. However, assuming that the bending loss of the optical cable 10 is smaller than 5000 kg·mm$^2$, the optical cable 10 can jam on the way of a duct when the optical cable 10 is underlaid by feeding by force within the duct, which makes it impossible to underlay the optical cable 10. On the other hand, assuming that the bending rigidity of the optical cable 10 is larger than 15000 kg·mm$^2$, the optical cable 10 cannot pass through a complicated duct when the optical cable 10 is underlaid by feeding by force within the duct, which still makes it impossible to underlay the optical cable 10. Similarly, the coefficient of dynamic friction of a material of an outer sheath of the cable is desirably 0.30 or less. Thus, in the case where the optical cable 10 is underlaid within the duct by feeding by force, the force-feeding rate is preferably 20 m/min or more in view of underlaying time and labor costs.

Next, an explanation will be given of a specific sample prepared for the optical cable 10 according to the aforementioned embodiment. In the optical cable 10 of a prepared sample, an outer diameter of each coated optical fiber 11 is 0.25 mm, an inner diameter of each tube 12 is 1.2 mm, outer diameters of each tube 12 and the tension member 13 are respectively 1.5 mm, and a cable outer diameter D is 6.7 mm. Twelve coated optical fibers 11 within each tube 12 are contained, and the total number N of the coated optical fibers 11 contained in the optical cable 10 is seventy-two. The six tubes 12 are stranded together around the tension member 13, the stranded pitch is 70 mm, and the stranded direction is reversed at a predetermined position in the longitudinal direction of the optical cable 10. Note that a pitch at the reversed position is 420 mm. Each tube 12 is made of polybutylene terephthalate, while the outer sheath is made of polyethylene. A cable weight per unit length is 42 kg/km.

Each coated optical fiber 11 composes a core region made of pure silica glass, and a cladding region made of F-doped silica glass provided at the outer periphery of the core region. The core region has an outer diameter (core diameter) of 7.9 μm, and a relative refractive index difference of 0.39% with respect to the cladding region. Each coated optical fiber 11 having such a structure has the following various characteristics. That is, a mode field diameter A at the wavelength of 1.31 μm was 8.53 μm, a fiber cutoff wavelength B was 1.23 μm, a ratio A/B was 6.93, and the wavelength of zero dispersion was 1.318 μm. The transmission loss at the wavelength of 1.31 μm was 0.289 dB/km or less, the transmission loss at the wavelength of 1.383 μm was 0.247 dB/km or less, and the transmission loss at the wavelength of 1.55 μm was 0.174 dB/km or less. Further, for several characteristics at the wavelength of 1.55 μm, the bending loss in the diameter of 20 mm was 1.8 dB/m, the chromatic dispersion was 15.0 ps/nm/km, the dispersion slope was 0.054 ps/nm$^2$/km, and RDS (=dispersion slope/chromatic dispersion) was 0.0036 /nm. The dispersion slope at a zero dispersion wavelength was 0.079 ps/nm$^2$/km. The polarization mode dispersion was 0.03 ps/km$^{1/2}$.

Figure 6:
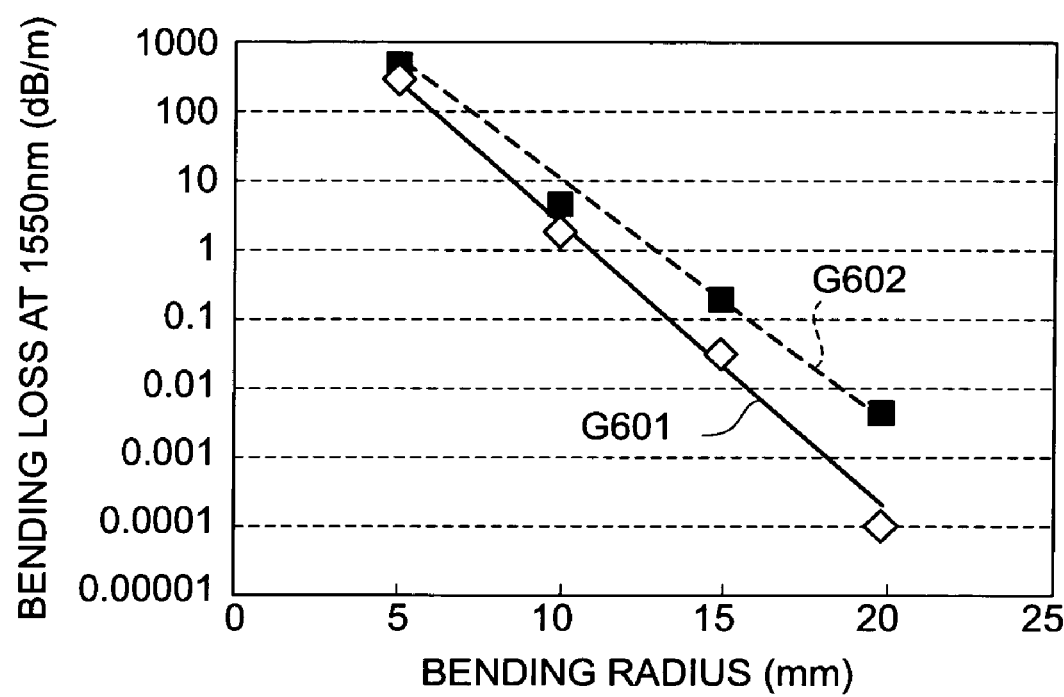
FIG. 6 is a graph indicating bending loss characteristics of a sample prepared as a coated optical fiber applied to the optical cable according to the present invention.
Figure 7:
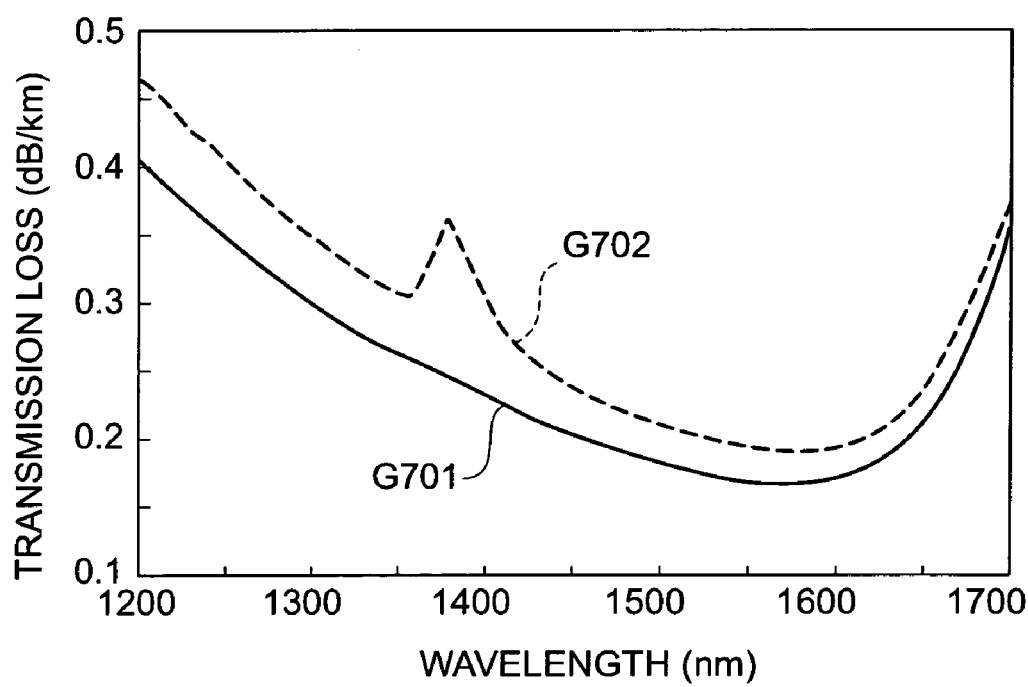
FIG. 7 is a graph indicating transmission loss characteristics of a sample prepared as a coated optical fiber applied to the optical cable according to the present invention.

FIG. 6 is a graph indicating bending loss characteristics of a sample prepared as a coated optical fiber 11. Also, FIG. 7 is a graph indicating transmission loss characteristics of the sample prepared as a coated optical fiber 11. As a comparative example for these graphs, characteristics of an optical fiber in compliance with the standard of ITU-TG.652.D are indicated by broken lines. In addition, in FIG. 6, graphs G601 and G602 indicate the bending losses of the sample and the comparative example, respectively. In FIG. 7, graphs G701 and G702 indicate the transmission losses of the sample and the comparative example, respectively.

As is apparent from FIGS. 6 and 7, the sample prepared as a coated optical fiber 11 is excellent in both the bending loss characteristic and transmission loss characteristic as compared to the optical fiber of the comparative example. Therefore, the coated optical fiber of the sample is applicable to a center-core type of optical cable, for another cable construction, in which a loose tube is arranged in the center of the cable while a tension member and/or inclusions are arranged on the periphery thereof.

An optical cable applied with the coated optical fibers each having the aforementioned characteristics (the above sample) is manufactured, and a variety of tests are implemented to this optical cable.

Figure 8:
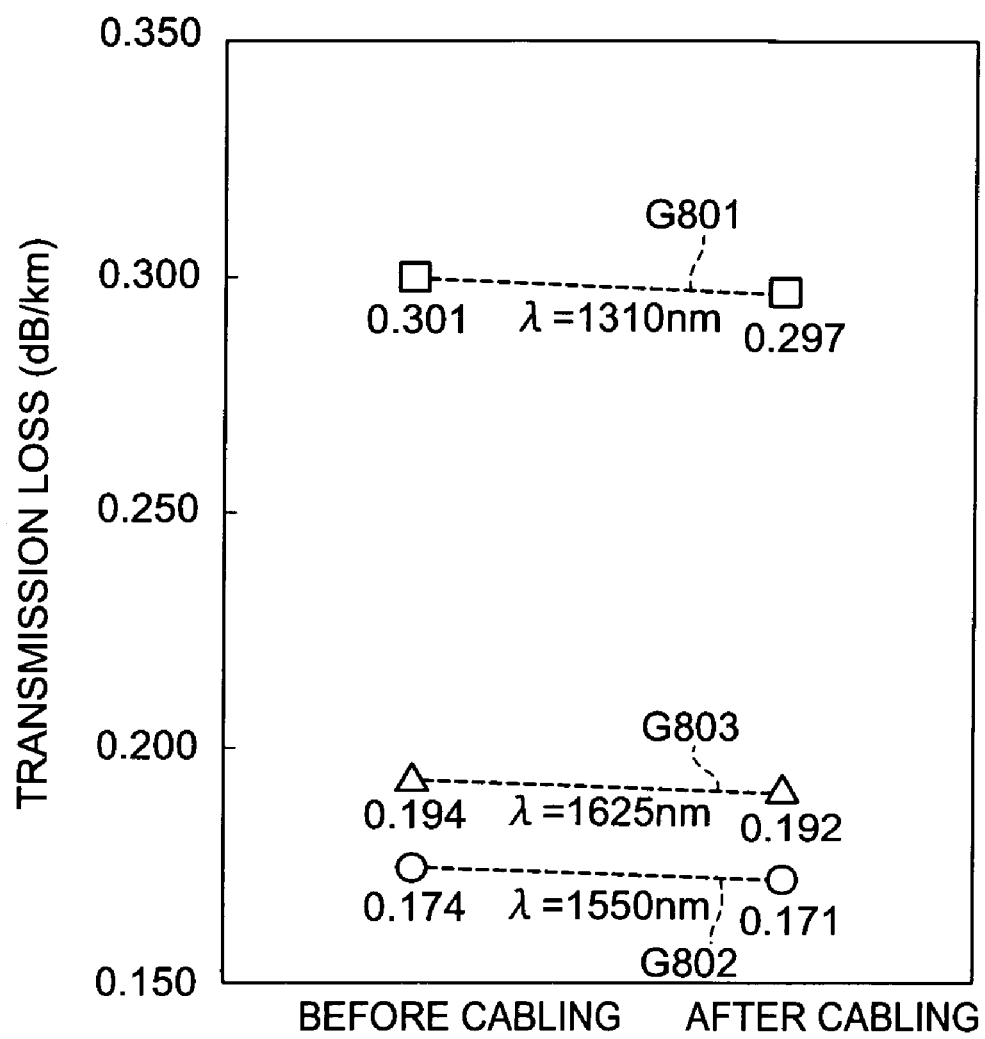
FIG. 8 is a graph indicating changes of the transmission loss before and after cabling of a sample prepared as a coated optical fiber applied to the optical cable according to the present invention.

FIG. 8 is a graph indicating changes before and after cabling of the transmission loss of the above sample prepared as a coated optical fiber 11. Note that in FIG. 8, graph G801, graph G802, and graph G803 indicate the transmission losses at the wavelengths of 1.31 µm, 1.55 µm and 1.625 µm, respectively.

As is apparently understood from FIG. 8, an increase of the transmission loss in the sample caused by the cabling is not seen.

Figure 9:
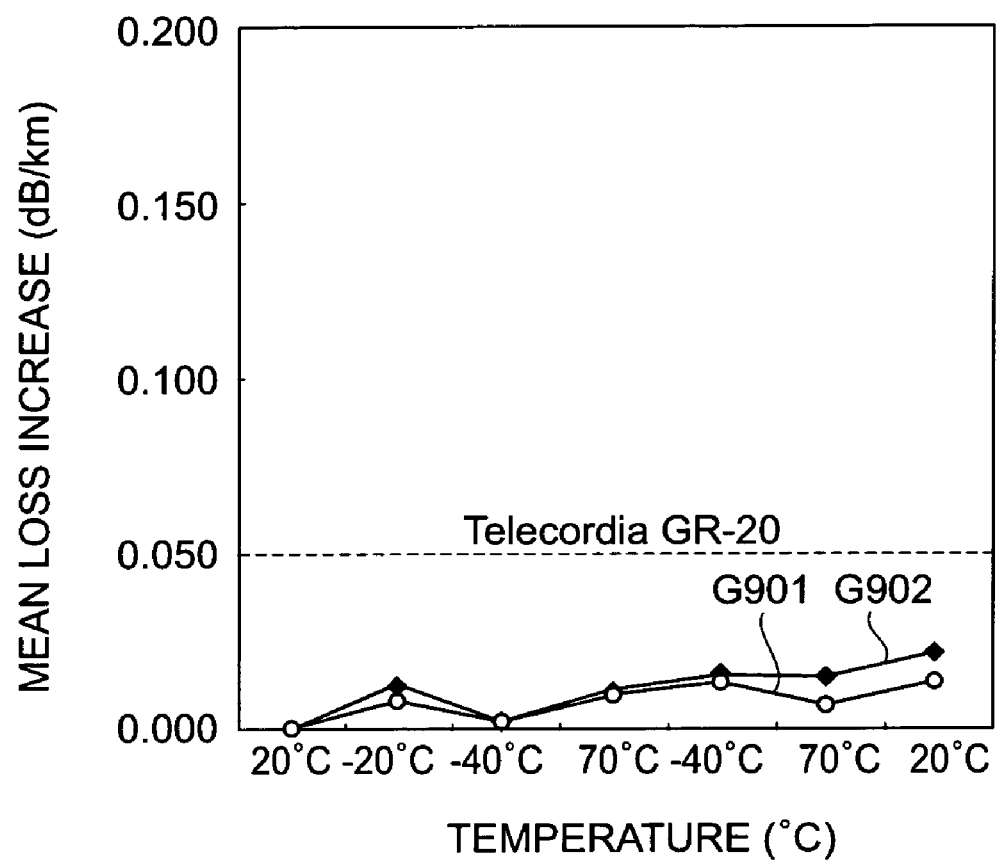
FIG. 9 is a graph indicating the change of the transmission loss at a wavelength of 1.55 µm in a temperature cycling test of a sample prepared as a coated optical fiber applied to the optical cable according to the present invention.

In addition, a temperature cycling test within the temperature range from −40° C. to +70° C. is implemented to an optical cable having a cable length of 1 km, applied with the coated optical fibers of the above sample. FIG. 9 is a graph indicating the change of the transmission loss at the wavelength of 1.55 µm in the temperature cycling test of the above sample prepared as a coated optical fiber. As is seen from FIG. 9, it is ascertained that the increase of the transmission loss of the sample at the wavelength of 1.55 µm is suppressed to 0.01 dB/km at the maximum. Thus, it is confirmed that the optical fiber applied as a coated optical fiber of the above sample has excellent temperature characteristics.

Further, a variety of mechanical tests according to test methods prescribed in Telecordia GR-20 to the optical fiber were implemented, applied as a coated optical fiber of the above sample. In a test pulling an optical cable having a cable length of 5.5 m at a tension strength of 1100 N, an increase of the transmission loss was 0.01 dB or less. In a test in which wrenching of ±90° was applied five times in a state where one end of an optical cable having a cable length of 1 m was fixed, while a load of 44 N was applied at the other end thereof, an increase of the transmission loss was 0.01 dB or less. In a test that bending of 360° was applied twenty-five times to an optical cable having a cable length of 5 m in a bending diameter of 160 mm, an increase of the transmission loss was 0.01 dB or less. In a test that a side pressure (2200 N in an initial period and 1100 N in a long period) was applied over the range of 100 mm in the longitudinal direction of an optical cable, an increase of the transmission loss was 0.03 dB or less. Also, in a test that an impact having an energy of 5 J was applied to the optical cable when an object was dropped from a position of 1 m in height, an increase of the transmission loss was 0.01 dB or less. As mentioned above, in each test prescribed in Telecordia GR-20, it was ascertained that the increase of the transmission loss in the optical cable was smaller than an allowable value. Thus, it was confirmed that the optical cable applied with the coated optical fibers of the above sample had an excellent mechanical characteristic.

As described above, while the optical cable 10 according to the present invention, as compared to a conventional seventy-two-fiber optical cable, has the characteristics equal to the conventional one, a diameter of the cable is reduced by 40%, and a sectional area of the cable performs substantially one-third, which enables a sufficiently reduced diameter. Alternatively, while the optical cable 10 according to the present invention, as compared to the conventional optical cable, has the characteristics equal to the conventional one, the contained efficiency of the coated optical fiber can be improved.

Figure 10:
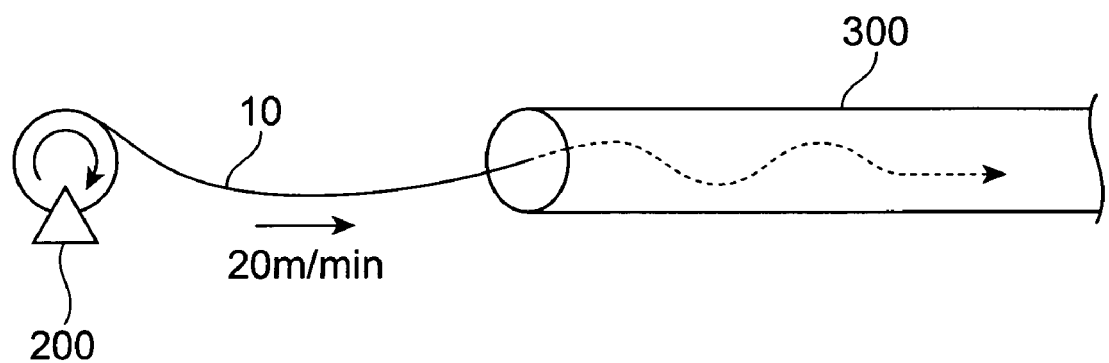
FIG. 10 is a view for explaining a force-feeding method of the optical cable according to the present invention.

Furthermore, the optical cable 10 according to the present invention is applicable to a cable for microduct-force-feeding while making use of light weight and flexibility with development of reduced diameter. In particular, as shown in FIG. 10, the optical cable 10 having a predetermined length is rolled around a force-feeding drum 200, and the optical cable 10 is force-fed from this drum 200 into a duct 300 at a force-feeding rate of 20 m/min or more. In this way, an underlay of the optical cable 10 is carried out into an existing duct. Here, FIG. 10 is a view for explaining a force-feeding method of an optical cable according to the present invention.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The optical cable according to the present invention is preferably applicable to an optical transmission line for an optical transmission system with a large capacity and so on.

The invention claimed is:

1. An optical cable, comprising:
   a tension member;
   a tube comprised of one of plastic and metal, stranded together around said tension member, and containing one or more coated optical fibers inside; and
   an outer sheath covering an outer periphery of said tube,
   wherein a ratio of A/B is 6.3 or more but 7.0 or less, where said each coated optical fiber has a mode field diameter A of 8.6±0.4 µm at a wavelength of 1.31 µm, and a fiber cutoff wavelength of said each coated optical fiber is B µm, and
   wherein each of said coated optical fibers comprises a core region made of pure silica glass, and a cladding region made of F-doped silica glass.

2. An optical cable according to claim 1,
   wherein a bending loss of said each coated optical fiber in the diameter of 20 mm at a wavelength of 1.55 µm is 3 dB/m or less.

3. An optical cable according to claim 1, wherein an extra length ratio of said each coated optical fiber to said tube is more than 0% but 0.10% or less.

4. An optical cable according to claim 1, wherein an extra length ratio of said each coated optical fibers to said tube is −0.03% or more but less than 0%.

5. An optical cable according to claim 1, wherein an occupied factor of said coated optical fibers within said tube is 20% or more but 75% or less.

6. An optical transmission system comprising an optical cable according to claim 1 for an optical transmission line for transmitting optical signals.

7. A force-feeding method, comprising the steps of:
   preparing an optical cable according to claim 1; and
   force-feeding said prepared optical cable at a force-feeding rate of 20 m/min or more.

8. An optical cable, comprising:
   a tension member;
   a tube comprised of one of plastic and metal, stranded together around said tension member, and containing one or more coated optical fibers; and
   an outer sheath covering an outer periphery of said tube,
   wherein each of said coated optical fibers comprises a core region made of pure silica glass, and a cladding region made of F-doped silica glass.

9. An optical cable according to claim 8, wherein a bending loss of said each coated optical fiber in the diameter of 20 mm at a wavelength of 1.55 μm is 3 dB/m or less.

10. An optical cable according to claim 8, wherein said each coated optical fiber has a transmission loss of 0.31 dB/km or less at a wavelength of 1.31 μm, a transmission loss of 0.29 dB/km or less at a wavelength of 1.38 μm, and a transmission loss of 0.18 dB/km or less at a wavelength of 1.55 μm.

11. An optical cable according to claim 8, wherein an increase of said each coated optical fiber is 0.05 dB/km or less at a wavelength of 1.38 μm after said each coated optical fiber is placed over four days in an atmosphere of a hydrogen concentration of 1% and then hydrogen molecules are removed.

12. An optical cable according to claim 8, wherein an increase of said each coated optical fiber is 2 dB/km or less at a wavelength of 1.55 μm after said each coated optical fiber is irradiated for an hour by γ rays of an absorbed dose of 1000 Gy/hr.

13. An optical cable according to claim 8, wherein an extra length ratio of said each coated optical fiber to said tube is more than 0% but 0.10% or less.

14. An optical cable according to claim 8, wherein an extra length ratio of said each coated optical fibers to said tube is −0.03% or more but less than 0%.

15. An optical cable according to claim 8, wherein an occupied factor of said coated optical fibers within said tube is 20% or more but 75% or less.

* * * * *